(12) United States Patent
Lee et al.

(10) Patent No.: US 12,553,934 B2
(45) Date of Patent: Feb. 17, 2026

(54) VEHICLE AND METHOD OF INSPECTING JUNCTION BOX OF VEHICLE

(71) Applicants: Hyundai Motor Company, Seoul (KR); Kia Corporation, Seoul (KR)

(72) Inventors: Donggeon Lee, Mungyeong-si (KR); Seungwoo Kim, Anyang-si (KR); Daehyun Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 168 days.

(21) Appl. No.: 18/471,869

(22) Filed: Sep. 21, 2023

(65) Prior Publication Data

US 2024/0272216 A1 Aug. 15, 2024

(30) Foreign Application Priority Data

Feb. 13, 2023 (KR) ........................ 10-2023-0018789

(51) Int. Cl.
  *G01R 31/00* (2006.01)
  *B60R 16/023* (2006.01)
  *G01R 31/327* (2006.01)

(52) U.S. Cl.
  CPC ........ *G01R 31/007* (2013.01); *B60R 16/0239* (2013.01); *G01R 31/3278* (2013.01)

(58) Field of Classification Search
  CPC .............. G01R 31/007; G01R 31/3278; G01R 31/006; G01R 31/52; G01R 19/0038; G01R 19/16576; G01R 31/14; B60R 16/0239; G07C 5/0816
  See application file for complete search history.

(56) References Cited

U.S. PATENT DOCUMENTS

| | | | |
|---|---|---|---|
| 2002/0121902 A1* | 9/2002 | Suzuki | B60L 3/0069 324/509 |
| 2004/0130326 A1* | 7/2004 | Yamamoto | B60L 3/0069 324/503 |
| 2007/0008666 A1* | 1/2007 | Morita | B60L 3/0069 361/42 |
| 2008/0129308 A1* | 6/2008 | Lindsey | G01R 31/52 324/525 |
| 2009/0001993 A1* | 1/2009 | Lindsey | B60W 10/08 340/650 |
| 2011/0115490 A1* | 5/2011 | Klijn | G01R 27/025 324/433 |
| 2012/0025844 A1* | 2/2012 | Morita | G01R 31/66 324/538 |
| 2018/0090879 A1* | 3/2018 | Hasegawa | H01B 7/0045 |

* cited by examiner

*Primary Examiner* — Daniel R Miller
(74) *Attorney, Agent, or Firm* — SLATER MATSIL, LLP

(57) ABSTRACT

An embodiment vehicle includes a measurement device configured to measure a voltage by applying an alternating current (AC) voltage to a first part of a positive busbar inside a junction box and detecting waveforms at a negative busbar and a second part of the positive busbar, respectively, and a controller configured to determine whether an error occurs in a connection state or an insulation state of a component of an internal circuit of the junction box or a connecting cable connected to a connector of the junction box by comparing the measured voltage with a reference value measured in advance in a steady state.

20 Claims, 4 Drawing Sheets

VEHICLE AND METHOD OF INSPECTING JUNCTION BOX OF VEHICLE

CROSS-REFERENCE TO RELATED APPLICATIONS

This application claims the benefit of Korean Patent Application No. 10-2023-0018789, filed on Feb. 13, 2023, which application is hereby incorporated herein by reference.

TECHNICAL FIELD

The disclosure relates to a vehicle and a method of inspecting a junction box of the vehicle.

BACKGROUND

A vehicle is provided with approximately 20 to 40 relays and approximately 10 fuses, with some variation depending on the size of the vehicle. When the relays and fuses are distributed, a structure becomes complex, which makes control difficult. Accordingly, a junction box is used to integrate the relays and fuses using a printed circuit board (PCB) and to distribute power to electrical devices (modules).

A junction box includes fuses, relays, diodes, and the like to prevent overcurrent and overloading of vehicle electronic components such as a fuel tank, engine, air conditioning, lights, and warning indicators. A junction box protects wiring and a vehicle from fires caused by electrical leaks and short circuits.

Meanwhile, for example, a hybrid vehicle uses a combination of an internal combustion engine and an electric motor, and the electric motor receives power from a high voltage battery to drive the vehicle. A hybrid vehicle may maximize an efficiency of vehicle operation by appropriately using an internal combustion engine and an electric motor depending on a vehicle's speed and driving state.

As such, as vehicles become more electrified and use higher voltages, the management of a junction box for distributing power between power sources (e.g., a battery) and loads (e.g., a micro control unit (MCU) for vehicles) and for controlling the supplied power and means connected thereto becomes critical.

For example, a junction box and high-voltage cables may malfunction for various reasons including inadequate measures when replacing components, ingress of foreign materials, poor connections, and moisture ingress into the cable.

Also, various malfunctions may be caused by poor connection between components inside a junction box, insulation breakdown, and the like.

However, whether a connection state and an insulation state between the components inside a junction box or between the junction box and an external device may not be easily checked in advance, and a significant safety risk is caused in the event of an error related thereto.

SUMMARY

An embodiment of the disclosure provides a vehicle and a method of inspecting a junction box of the vehicle that may conveniently confirm whether an error occurs in a connection state and an insulation state between components inside the junction box or between the junction box and an external device.

Additional embodiments of the disclosure will be set forth in part in the description which follows and, in part, will be obvious from the description or may be learned by practice of the disclosure.

According to an embodiment of the disclosure, a vehicle may include a measurement part configured to measure a voltage by applying an alternating current (AC) voltage to a first part of a positive busbar inside a junction box and detecting waveforms at a negative busbar and a second part of the positive busbar, respectively, and a controller configured to determine whether an error occurs in a connection state and an insulation state of at least one of a component of an internal circuit of the junction box or a connecting cable connected to a connector of the junction box by comparing the measured voltage with a reference value measured in advance in a steady state.

The controller may be configured to determine that an insulation breakdown occurs between the positive busbar and the negative busbar in response to a same voltage being measured at the negative busbar and the second part of the positive busbar.

In response to a voltage measured at the negative busbar or the second part of the positive busbar being identical to a power voltage of the controller, the controller may be configured to determine that an insulation breakdown occurs between a low voltage line of a low voltage battery supplying power to the controller and the positive busbar or the negative busbar on which the identical voltage is measured.

In response to a difference between the voltage measured at the negative busbar or the second part of the positive busbar and the reference value exceeding a threshold, the controller may be configured to determine that an insulation breakdown occurs in at least one of a first cable connecting the junction box and a high voltage battery supplying power to the junction box or a second cable connecting the junction box and an electrical device receiving power from the junction box.

In response to no voltage being measured at the second part of the positive busbar or the voltage measured at the second part of the positive busbar not being a steady state value when compared to the reference value, the controller may be configured to determine that a short circuit or contact failure occurs between a positive busbar line where the first part is located and the second part.

The controller may include a micro controller unit (MCU).

The vehicle may further include a display configured to receive and display a result of determining whether the error occurs in the connection state and the insulation state of at least one of the component of the internal circuit of the junction box or the connecting cable connected to the connector of the junction box from the MCU.

According to an embodiment of the disclosure, a method of inspecting a junction box of a vehicle may include applying an AC voltage to a first part of a positive busbar inside the junction box, detecting waveforms at a negative busbar and a second part of the positive busbar, respectively, to measure a voltage, comparing, by a controller, the measured voltage with a reference value measured in advance in a steady state, and determining whether an error occurs in a connection state and an insulation state of at least one of a component of an internal circuit of the junction box or a connecting cable connected to a connector of the junction box.

The determining may include determining that an insulation breakdown occurs between the positive busbar and the negative busbar in response to a same voltage being measured at the negative busbar and the second part of the positive busbar.

In response to a voltage measured at the negative busbar or the second part of the positive busbar being identical to a power voltage of the controller, the determining may include determining that an insulation breakdown occurs between a low voltage line of a low voltage battery supplying power to the controller and the positive busbar or the negative busbar on which the identical voltage is measured.

In response to a difference between the voltage measured at the negative busbar or the second part of the positive busbar and the reference value exceeding a threshold, the determining may include determining that an insulation breakdown occurs in at least one of a first cable connecting the junction box and a high voltage battery supplying power to the junction box or a second cable connecting the junction box and an electrical device receiving power from the junction box.

In response to no voltage being measured at the second part of the positive busbar or the voltage measured at the second part of the positive busbar not being a steady state value when compared to the reference value, the determining may include determining that a short circuit or contact failure occurs between a positive busbar line where the first part is located and the second part.

The method may further include receiving a result of determining whether the error occurs in the connection state and the insulation state of at least one of the component of the internal circuit of the junction box or the connecting cable connected to the connector of the junction box and displaying the result on a display.

BRIEF DESCRIPTION OF THE DRAWINGS

These and/or other embodiments of the disclosure will become apparent and more readily appreciated from the following description of the embodiments, taken in conjunction with the accompanying drawings, of which.

DETAILED DESCRIPTION OF ILLUSTRATIVE EMBODIMENTS

Figure 1:
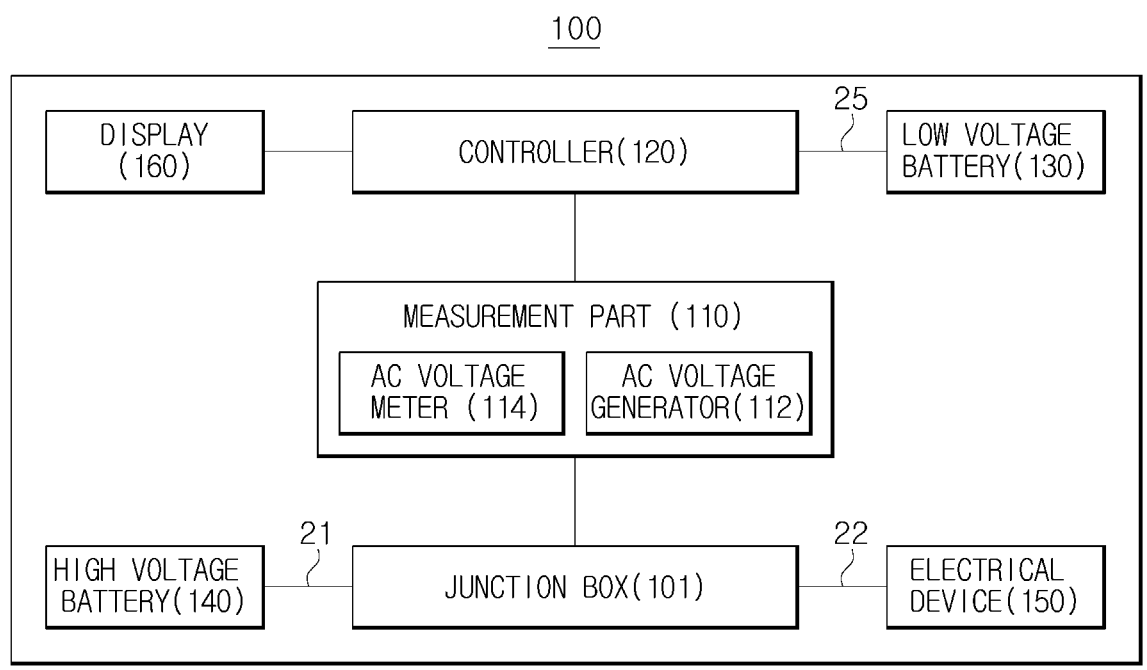
FIG. 1 is a block diagram illustrating a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted.

It should be further understood that the terms "include", "comprise" and/or "have" and variations thereof, when used in this specification, specify the presence of stated features, integers, steps, operations, elements, and/or components, but do not preclude the presence or addition of one or more other features, integers, steps, operations, elements, components, and/or groups thereof.

The term "and/or" includes any and all combinations of one or more of the associated listed items.

It is to be understood that the singular forms are intended to include the plural forms as well, unless the context clearly dictates otherwise.

The terms such as "part", "module", "member", and "block" may be embodied as hardware or software. In some forms of embodiments of the present disclosure, a plurality of "units", "modules", "members", and "blocks" may be implemented as a single component or a single "unit", "module", "member", and "block" may include a plurality of components.

Reference numerals used for method steps are just used for convenience of explanation, but not to limit an order of the steps. Thus, unless the context clearly dictates otherwise, the written order may be practiced otherwise.

Hereinafter, embodiments of the disclosure will be described in detail with reference to the accompanying drawings.

Figure 2:
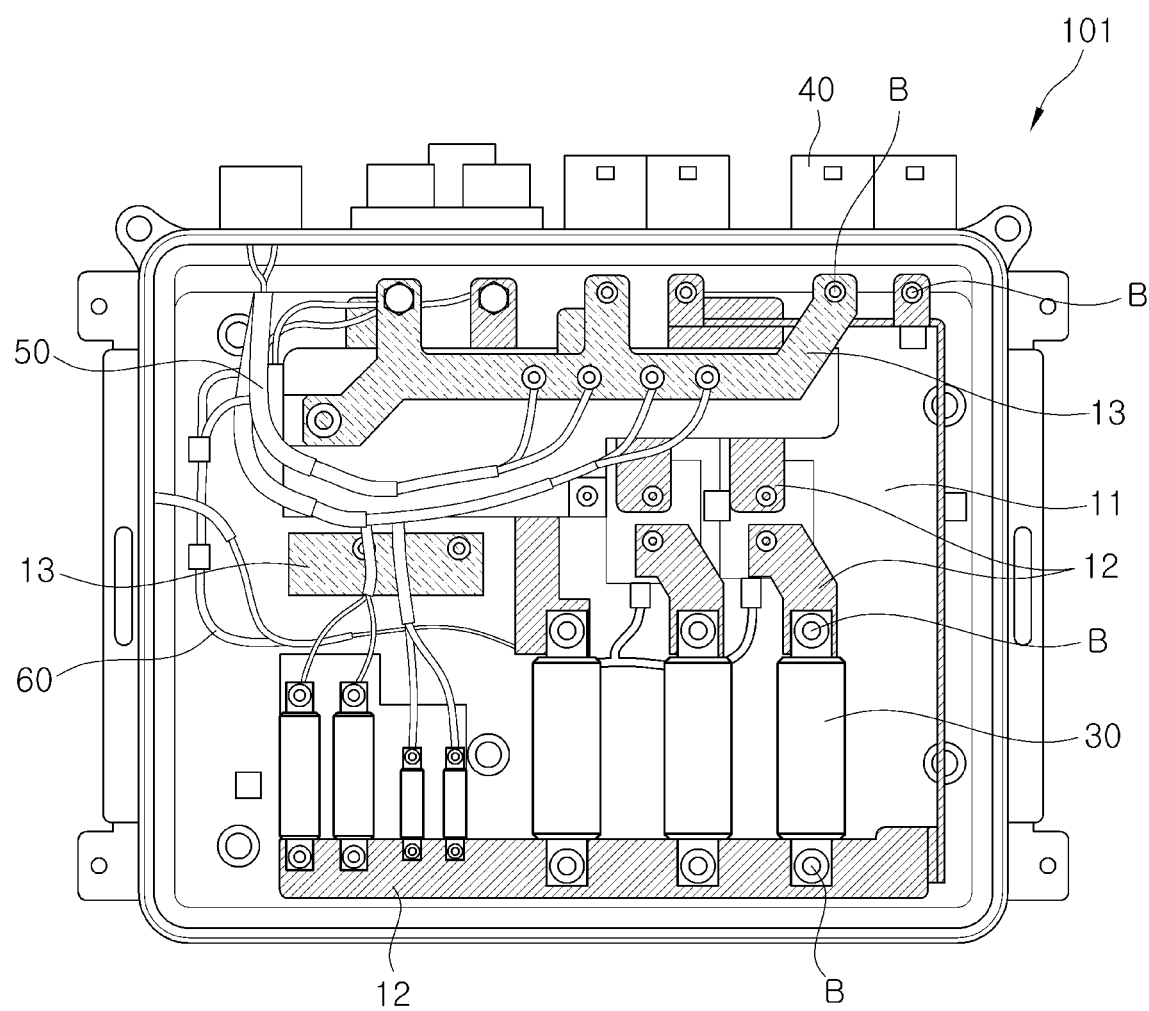
FIG. 2 illustrates an internal configuration of a junction box of FIG. 1.
Figure 3:
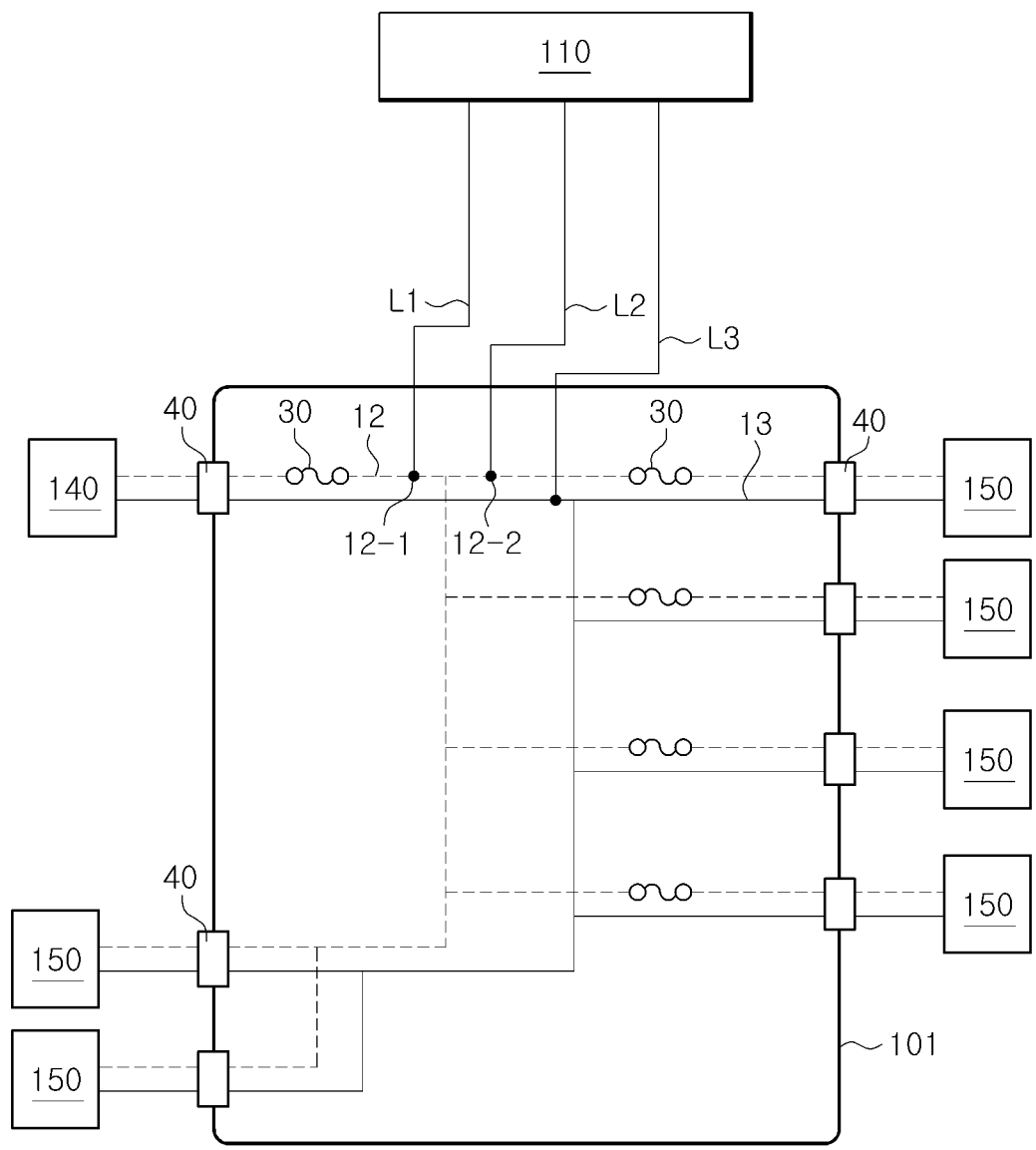
FIG. 3 illustrates a connection configuration of a measurement part for inspection of the junction box of FIG. 2.

FIG. 1 is a block diagram illustrating a vehicle according to an embodiment. FIG. 2 illustrates an internal configuration of a junction box of FIG. 1. FIG. 3 illustrates a connection configuration of a measurement part for inspection of the junction box of FIG. 2. For reference, in FIG. 3, only a main part of an internal configuration of the junction box of FIG. 2 is illustrated for understanding embodiments of the present disclosure.

Referring to FIG. 1, a vehicle 100 according to an embodiment includes a junction box 101, a measurement part 110, a controller 120, a low voltage battery 130, a high voltage battery 140, an electrical device 150, and a display 160.

The junction box 101 may be installed in an engine compartment of the vehicle 100 and distribute energy from the high voltage battery 140 to each of a plurality of the high-voltage electrical devices 150. The high-voltage electrical devices 150 may include, for example, a heater, an air conditioner, a motor, a compressor, and the like.

Referring to FIG. 2 and FIG. 3, a positive busbar 12 and a negative busbar 13 are connected to a printed circuit board 11 of the junction box 101 to electrically connect relays and fuses 30, and the like, included in the junction box 101.

The positive busbar 12 connects a positive terminal of the high voltage battery 140 and a positive terminal of the electrical device 150 to allow current to flow.

The negative busbar 13 connects a negative terminal of the high voltage battery 140 and a negative terminal of the electrical device 150 to allow current to flow.

The fuses 30 are electrically connected to the busbars 12 and 13 to prevent overcurrent in the junction box 101.

A connector 40 connects the high voltage battery 140 and the electrical device 150 to the junction box 101 through connecting cables 21 and 22. The connecting cables 21 and 22 connected to the connector 40 include the first cable 21 connecting the junction box 101 and the high voltage battery 140 supplying power to the junction box 101 and the second cable 22 connecting the junction box 101 and the electrical device 150 receiving power from the junction box 101.

Internal cables 50 and 60 transfer power from the high voltage battery 140 to the electrical device 150.

Internal elements such as the busbars, fuses, relays, and the like inside the junction box 101 may be bolted together by bolts B.

The measurement part 110 applies an alternating current (AC) voltage to a first part 12-1 of the positive busbar 12 inside the junction box 101 and measures a voltage by detecting waveforms at the negative busbar 13 and a second part 12-2 of the positive busbar 12, respectively.

The second part 12-2 of the positive busbar 12 is a current-flowing position with a positive busbar line where the first part 12-1 is located, i.e., the second part 12-2 of the positive busbar 12 is energized with the positive busbar line where the first part 12-1 is located, and any position on the positive busbar 12 may be selected as the second part 12-2.

The measurement part 110 may include an AC voltage generator 112 applying an AC voltage to the first part 12-1 of the positive busbar 12 inside the junction box 101 and an AC voltage meter 114 measuring a voltage by detecting waveforms at the negative busbar 13 and the second part 12-2 of the positive busbar 12, respectively.

The AC voltage generator 112 may generate an AC voltage according to a command of the controller 120 to be described later and apply the AC voltage to the first part 12-1 of the positive busbar 12 inside the junction box 101 through a first connection line L1.

The AC voltage meter 114 measures a voltage by detecting waveforms at the second part 12-2 of the positive busbar 12 connected by a second connection line L2 and the negative busbar 13 connected by a third connection line L3, respectively.

The AC voltage applied to the first part 12-1 of the positive busbar 12 is transferred to each component connected to the positive busbar 12 and the negative busbar 13 causing reflection, refraction, interference, overlapping, and the like. The AC voltage applied to the first part 12-1 of the positive busbar 12 may be detected in a form of a composite wave at the second part 12-2 of the positive busbar 12 and the negative busbar 13, respectively. In this instance, when a change in reflection or refraction occurs due to a change in resistance, inductance, capacitance, or the like in a circuit of the junction box 101, the waveform measured by the AC voltage meter 114 also changes.

The controller 120 may control constituent components of the vehicle 100 and means related thereto in order to inspect the junction box 101 according to an embodiment and may include a variety of processors and memories (not shown). The memory may store programs, instructions, applications, etc. for control, and the processor may execute the programs, the instructions, the applications, etc. stored in the memory.

The memory may include, for example, a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a hard disk drive (HDD), or a compact disc read only memory (CD-ROM), without being limited thereto.

The controller 120 may compare the voltage measured by the measurement part 110 with a reference value measured in advance in a steady state, thereby determining whether an error occurs in a connection state and an insulation state of at least one of a component of an internal circuit of the junction box 101 or connecting cables 21 and 22 connected to the connector 40 of the junction box 101.

Here, the connecting cables 21 and 22 may include the first cable 21 connecting the junction box 101 and the high voltage battery 140 supplying power to the junction box 101 and the second cable 22 connecting the junction box 101 and the electrical device 150 receiving power from the junction box 101.

Specifically, the controller 120 compares the voltage measured at the second part 12-2 of the positive busbar 12 and the negative busbar 13 by the measurement part 110 with the reference value measured in advance in a steady state. When an error occurs in the connection state and the insulation state of at least one of the component of the internal circuit of the junction box 101 or the connecting cables 21 and 22 connected to the connector 40 of the junction box 101, a change occurs in the waveforms detected in a form of composite waves at the negative busbar 13 and the second part 12-2 of the positive busbar 12, respectively, resulting in differences when compared to the reference value measured in the steady state.

When the same voltage is measured at the negative busbar 13 and the second part 12-2 of the positive busbar 12, the controller 120 may determine that an insulation breakdown has occurred between the positive busbar 12 and the negative busbar 13.

That is, when the same voltage is measured at the negative busbar 13 and the second part 12-2 of the positive busbar 12, both the corresponding positive busbar 12 and the negative busbar 13 are energized with each other, indicating that insulation breakdown has occurred. When the positive busbar 12 is in contact with the negative busbar 13 due to failures such as a failure in bolting, the same voltage may be measured due to the current-flowing state.

Also, when the voltage measured at the negative busbar 13 or the second part 12-2 of the positive busbar 12 is identical to a power voltage of the controller 120, the controller 120 may determine that an insulation breakdown has occurred between a low voltage line 25 of the low voltage battery 130 supplying power to the controller 120 and the positive busbar 12 or the negative busbar 13 on which the identical voltage is measured.

That is, a cover (not shown) of the junction box 101 is provided in a state of being in contact with a vehicle body and is energized with the low voltage line 25. Accordingly, when the bolt B fastening the positive busbar 12 or the negative busbar 13 is loosened and contacts the cover of the junction box 101, the cover and the low voltage line 25 are energized with each other, and thus the same voltage value of the low voltage line 25 and the positive busbar 12 or the negative busbar 13 may be measured. In this instance, for example, 0 (zero) volts may be measured based on the low voltage battery 130 of the vehicle.

In addition, when a difference between the voltage measured at the negative busbar 13 or the second part 12-2 of the positive busbar 12 and the reference value exceeds a threshold, the controller 120 may determine that an insulation breakdown has occurred in at least one of the first cable 21 connecting the junction box 101 and the high voltage battery 140 supplying power to the junction box 101 or the second cable 22 connecting the junction box 101 and the electrical device 150 receiving power from the junction box 101.

Specifically, the first cable 21 and the second cable 22 are each a high voltage cable, and braided wires of the first cable 21 and the second cable 22 are connected to the vehicle body so that a voltage or current generated by the braided wires flows to the vehicle body. When a core wire (not shown) is connected to the vehicle body due to a poor insulation state of the braided line of the first cable 21 or the second cable 22, a voltage level may suddenly decrease, causing the difference between the voltage measured at the negative busbar 13 or the second part 12-2 of the positive busbar 12 and the reference value measured in advance in the steady state to exceed the threshold.

Further, when no voltage is measured at the second part 12-2 of the positive busbar 12 or the voltage measured at the second part 12-2 of the positive busbar 12 is not a steady state value when compared to the reference value, the controller 120 may determine that a short circuit or a contact failure occurs between a positive busbar line where the first part 12-1 is located and the second part.

That is, because all the positive busbars 12 are energized with each other, when an AC voltage is applied to the first part 12-1 of the positive busbar 12, corresponding AC voltage waveforms may be measured in all the positive busbars 12 as well. However, for example, in a state where the second part 12-2 of the positive busbar 12 and the first part 12-1 of the positive busbar 12 are energized with each other by the bolt B with the fuse 30 interposed therebetween, when the second part 12-2 of the positive busbar 12 and the first part 12-1 of the positive busbar 12 are short-circuited by the loosening of the bolt B, no waveform may be measured or a waveform different from a normal waveform may be measured at the second part 12-2 of the positive busbar 12.

The controller 120 may include a micro controller unit (MCU).

The display 160 may receive a result of determining whether the error occurs in the connection state and the insulation state of at least one of the component of the internal circuit of the junction box 101 or the connecting cables 21 and 22 connected to the connector 40 of the junction box 101 from the controller 120 and display the result.

The display 160 may be mounted on an audio, video, navigation, telematics (AVNT) area, a cluster, or a head-up area in front of a driver inside the vehicle 100, without being limited thereto.

The display 160 may intuitively convey various information to the driver about an interior and exterior of the vehicle 100.

The display 160 may be embedded in or mounted on the dashboard.

The display 160 may include a light emitting diode (LED) panel, an organic LED (OLED) panel, or a liquid crystal display (LCD) panel. The display 160 may include a touch screen to receive touch operations from a user.

For example, when a junction box inspection function according to an embodiment is provided as a menu on the display 160, the user may select the menu to perform the inspection of the junction box 101. In this case, a signal for performing the inspection of the junction box 101 is received from the above-described controller 120 according to the menu selection, and the inspection of the junction box 101 may be performed.

Figure 4:
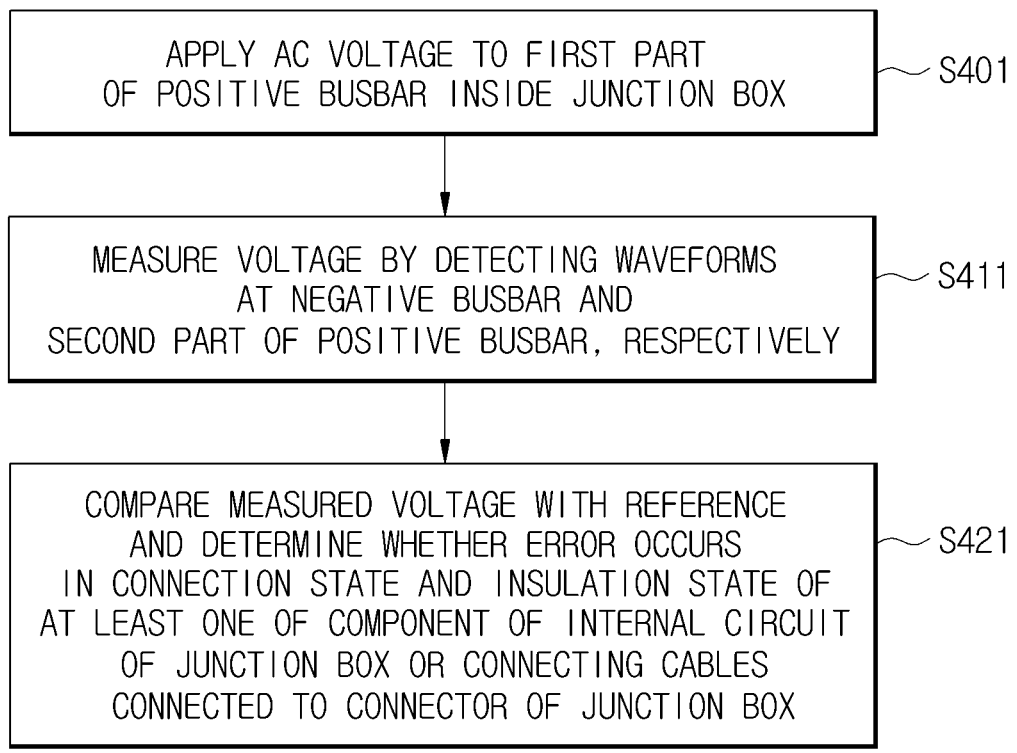
FIG. 4 is a flowchart illustrating a method of inspecting a junction box of a vehicle according to an embodiment.

FIG. 4 is a flowchart illustrating a method of inspecting a junction box of a vehicle according to an embodiment.

Referring to FIG. 4, the measurement part 110 applies an AC voltage to the first part 12-1 of the positive busbar 12 inside the junction box 101 (S401).

The measurement part 110 measures a voltage by detecting waveforms at the negative busbar 13 and the second part 12-2 of the positive busbar 12, respectively (S411).

The controller 120 compares the measured voltage with a reference value measured in advance in a steady state, thereby determining whether an error occurs in a connection state and an insulation state of at least one of a component of an internal circuit of the junction box 101 or the connecting cables 21 and 22 connected to the connector 40 of the junction box 101 (S421).

In operation S421, when the same voltage is measured at the negative busbar 13 and the second part 12-2 of the positive busbar 12, it may be determined that an insulation breakdown has occurred between the positive busbar 12 and the negative busbar 13.

Also, in operation S421, when the voltage measured at the negative busbar 13 or the second part 12-2 of the positive busbar 12 is identical to a power voltage of the controller 120, it may be determined that an insulation breakdown has occurred between the low voltage line 25 of the low voltage battery 130 supplying power to the controller 120 and the positive busbar 12 or the negative busbar 13 on which the identical voltage is measured.

In addition, in operation S421, when a difference between the voltage measured at the negative busbar 13 or the second part 12-2 of the positive busbar 12 and the reference value exceeds a threshold, it may be determined that an insulation breakdown has occurred in at least one of the first cable 21 connecting the junction box 101 and the high voltage battery 140 supplying power to the junction box 101 or the second cable 22 connecting the junction box 101 and the electrical device 150 receiving power from the junction box 101.

Afterwards, the display 160 may receive and display a result of determining whether the error occurs in the connection state and the insulation state of at least one of the component of the internal circuit of the junction box 101 or the connecting cables 21 and 22 connected to the connector 40 of the junction box 101.

As is apparent from the above, according to the embodiments of the disclosure, the vehicle and the method of inspecting a junction box of the vehicle can conveniently confirm whether an error occurs in a connection state and an insulation state between components inside the junction box or between the junction box and an external device.

Although embodiments have been described for illustrative purposes, those skilled in the art will appreciate that various modifications, additions, and substitutions are possible without departing from the scope and spirit of the disclosure. Therefore, embodiments have not been described for limiting purposes.

What is claimed is:

1. A vehicle comprising:
 a measurement device configured to measure voltages by applying an alternating current (AC) voltage to a first part of a positive busbar inside a junction box with reference to a vehicle ground and detecting waveforms at a negative busbar and a second part of the positive busbar, respectively; and
 a controller configured to determine whether an error occurs in a connection state or an insulation state of a component of an internal circuit of the junction box or a connecting cable connected to a connector of the junction box by comparing the measured voltages with a reference value measured in advance in a steady state.

2. The vehicle of claim 1, wherein, in response to a first voltage being measured at the negative busbar and a second voltage measured at the second part of the positive busbar being the same, the controller is configured to determine that an insulation breakdown occurs between the positive busbar and the negative busbar.

3. The vehicle of claim 1, wherein, in response to a first voltage measured at the negative busbar or a second voltage measured at the second part of the positive busbar being an identical voltage that is identical to a power voltage of the controller, the controller is configured to determine that an insulation breakdown occurs between a low voltage line of a low voltage battery configured to supply power to the controller and the positive busbar or the negative busbar on which the identical voltage is measured.

4. The vehicle of claim 1, wherein, in response to a difference between a first voltage measured at the negative busbar or a second voltage measured at the second part of the positive busbar and the reference value exceeding a threshold, the controller is configured to determine that an insulation breakdown occurs in a first cable connecting the junction box and a high voltage battery supplying power to the junction box or in a second cable connecting the junction box and an electrical device receiving power from the junction box.

5. The vehicle of claim 1, wherein, in response to no voltage being measured at the second part of the positive busbar or a voltage measured at the second part of the positive busbar not being a steady state value in comparison to the reference value, the controller is configured to determine that a short circuit or a contact failure occurs between a positive busbar line where the first part is located and the second part.

6. The vehicle of claim 1, wherein the controller comprises a micro controller unit (MCU).

7. The vehicle of claim 6, further comprising a display configured to receive and display a result of determining whether the error occurs in the connection state or the insulation state of the component of the internal circuit of the junction box or the connecting cable connected to the connector of the junction box from the MCU.

8. A method of inspecting a junction box of a vehicle, the method comprising:
applying an alternating current (AC) voltage to a first part of a positive busbar inside the junction box with reference to a vehicle ground;
detecting waveforms respectively at a negative busbar and a second part of the positive busbar, to measure voltages;
comparing the measured voltages with a reference value measured in advance in a steady state; and
determining whether an error occurs in a connection state or an insulation state of a component of an internal circuit of the junction box or a connecting cable connected to a connector of the junction box.

9. The method of claim 8, wherein determining whether the error occurs comprises determining that an insulation breakdown occurs between the positive busbar and the negative busbar based on a first voltage measured at the negative busbar and a second voltage measured at the second part of the positive busbar being the same.

10. The method of claim 8, wherein, in response to a first voltage measured at the negative busbar or a second voltage measured at the second part of the positive busbar being an identical voltage that is identical to a power voltage of a controller, determining whether the error occurs comprises determining that an insulation breakdown occurs between a low voltage line of a low voltage battery supplying power to the controller and the positive busbar or the negative busbar on which the identical voltage is measured.

11. The method of claim 8, wherein determining whether the error occurs comprises determining that an insulation breakdown occurs in a first cable connecting the junction box and a high voltage battery supplying power to the junction box or in a second cable connecting the junction box and an electrical device receiving power from the junction box based on a difference between a first voltage measured at the negative busbar or a second voltage measured at the second part of the positive busbar and the reference value exceeding a threshold.

12. The method of claim 8, wherein determining whether the error occurs comprises determining that a short circuit or a contact failure occurs between a positive busbar line where the first part is located and the second part based on no voltage being measured at the second part of the positive busbar or a voltage measured at the second part of the positive busbar not being a steady state value in comparison to the reference value.

13. The method of claim 8, further comprising:
receiving a result of determining whether the error occurs in the connection state or the insulation state of the component of the internal circuit of the junction box or the connecting cable connected to the connector of the junction box; and
displaying the result on a display.

14. A system for inspecting a junction box of a vehicle, the system comprising:
a high voltage battery disposed in the vehicle;
an electrical device;
the junction box disposed in the vehicle and configured to distribute energy from the high voltage battery to the electrical device, wherein the junction box comprises a positive busbar and a negative busbar connected to a printed circuit board;
a connector comprising a first connecting cable connecting the high voltage battery to the junction box and a second connecting cable connecting the electrical device to the junction box;
a measurement device configured to measure voltages by applying an alternating current (AC) voltage to a first part of the positive busbar with reference to a vehicle ground and detecting waveforms at the negative busbar and a second part of the positive busbar, respectively; and
a controller configured to determine whether an error occurs in a connection state or an insulation state of a component of an internal circuit of the junction box or the first connecting cable or the second connecting cable connected to the connector by comparing the measured voltages with a reference value measured in advance in a steady state.

15. The system of claim 14, wherein, in response to a first voltage measured at the negative busbar and a second voltage measured at the second part of the positive busbar being the same, the controller is configured to determine that an insulation breakdown occurs between the positive busbar and the negative busbar.

16. The system of claim 14, further comprising a low voltage battery disposed in the vehicle and configured to supply power to the controller, wherein, in response to a first voltage measured at the negative busbar or a second voltage measured at the second part of the positive busbar being an identical voltage that is identical to a power voltage of the controller, the controller is configured to determine that an insulation breakdown occurs between a low voltage line of the low voltage battery and the positive busbar or the negative busbar on which the identical voltage is measured.

17. The system of claim 14, wherein, in response to a difference between a first voltage measured at the negative busbar or a second voltage measured at the second part of the positive busbar and the reference value exceeding a threshold, the controller is configured to determine that an insulation breakdown occurs in the first connecting cable or the second connecting cable.

18. The system of claim 14, wherein, in response to no voltage being measured at the second part of the positive busbar or a voltage measured at the second part of the positive busbar not being a steady state value in comparison to the reference value, the controller is configured to determine that a short circuit or a contact failure occurs between a positive busbar line where the first part is located and the second part.

19. The system of claim 14, wherein the controller comprises a micro controller unit (MCU).

20. The system of claim 19, further comprising a display disposed in the vehicle and configured to:
   receive from the MCU a result of determining whether the error occurs in the connection state or the insulation state of the component of the internal circuit of the junction box or the first connecting cable or the second connecting cable connected to the connector; and
   display the result.

\* \* \* \* \*